GEORGE COLLINS.
Improvement in Rotary Cultivator.

No. 124,332. Patented March 5, 1872.

WITNESSES
E. H. Bates
G. E. Upham.

INVENTOR
George Collins,
Chipman Hosmer & Co.
Attys.

124,332

UNITED STATES PATENT OFFICE.

GEORGE COLLINS, OF FREMONT, NEBRASKA.

IMPROVEMENT IN ROTARY CULTIVATORS.

Specification forming part of Letters Patent No. 124,332, dated March 5, 1872.

*To all whom it may concern:*

Be it known that I, GEORGE COLLINS, of Fremont, in the county of Dodge and State of Nebraska, have invented a new and valuable Improvement in Rotary Cultivators; and I do hereby declare that the following is a full, clear, and exact description of the construction and operation of the same, reference being had to the annexed drawing making a part of this specification, and to the letters and figures of reference marked thereon.

Figure 1:
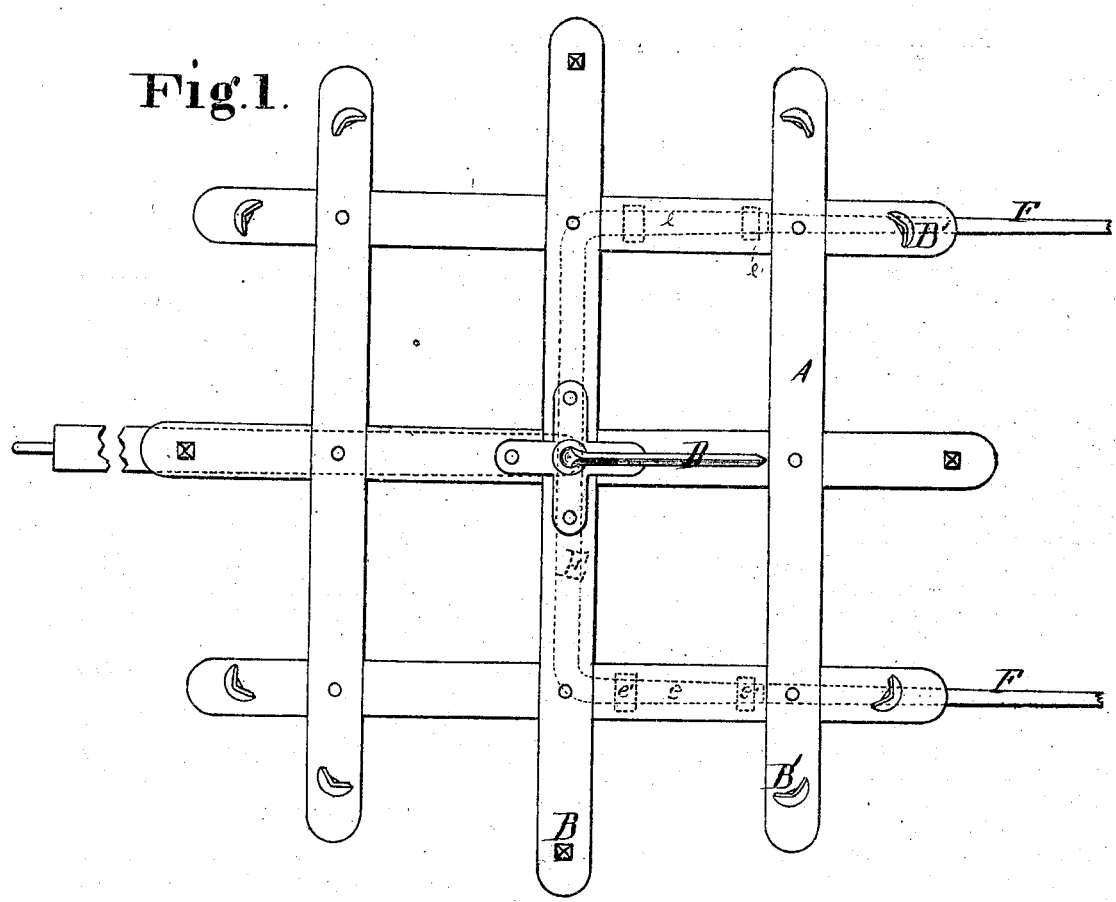
Figure 2:
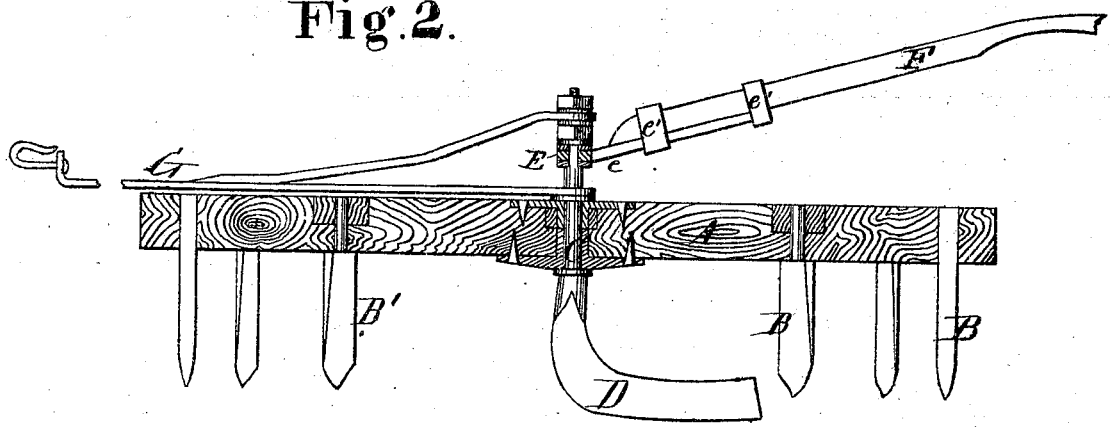

Figure 1 of the drawing is a representation of a top-plan view of my invention. Fig. 2 is a side elevation of the same.

This invention has relation to rotary cultivators; and consists in the construction and novel arrangement of the draft-beam and of the guiding appliance, as hereinafter described.

In the drawing, A represents the frame of the rotary cultivator, composed of beams placed at right angles to each other, as those of an ordinary harrow. B B′ represent the cultivator-teeth, the former consisting of pointed shanks or spikes, the latter of a concavo-convex or shovel-shape, vertically arranged and pointed. The teeth B′ are located in pairs at the four corners of the frame, as shown, and serve to cut and pulverize the soil. The teeth B break the clods and scatter the large and hard lumps of earth. C designates a vertical shaft, around which the frame rotates. On the lower end of said shaft is formed or secured a sharp-edged rudder, D, by means of which the implement is guided and its turning assisted. To the upper part of the shaft is secured a transverse bar, E, having arms e, with loops e′, to which is secured the guiding-handle F. G indicates the draft-pole, having its rear end bifurcated, and the arms placed over the shaft, one above and the other below the bar E, as shown. By this means the strain on the shaft is distributed.

The above-described implement may be used as a harrow or as a cultivator. In the latter capacity it is believed to be useful in the cultivation of corn, as it may be guided in the proper direction.

What I claim as my invention, and desire to secure by Letters Patent, is—

1. In a rotary cultivator, the rudder D, secured to the movable shaft C, and governed by the handles F, or their equivalents, substantially as specified.

2. The combination of the rotary frame A, teeth B B′, shaft C, rudder D, transverse bar E, and guiding-arms F, as and for the purpose specified.

In testimony that I claim the above I have hereunto subscribed my name in the presence of two witnesses.

GEORGE COLLINS.

Witnesses:
A. T. WESTFALL,
H. P. BOUNKER.